United States Patent [19]

Durda et al.

[11] 4,117,044
[45] Sep. 26, 1978

[54] AERATOR

[76] Inventors: Stanley J. Durda, 1845 Meadowview Rd., Bloomington, Minn. 55420; Walter D. Gustafson, 6800 Park Ave. South, Minneapolis, Minn. 55423

[21] Appl. No.: 820,547

[22] Filed: Aug. 1, 1977

Related U.S. Application Data

[63] Continuation of Ser. No. 668,501, Mar. 19, 1976, abandoned.

[51] Int. Cl.² .............................................. B01F 3/04
[52] U.S. Cl. ...................................... 261/30; 210/169; 210/221 P; 261/84; 261/93; 261/121 M
[58] Field of Search ....................... 261/84, 87, 93, 91, 261/120, 122, 123, 124, 121 M, 30–33, 86, 36 R, 28, 29; 310/219, 220, 169, 221 P, 221 M

[56] References Cited

U.S. PATENT DOCUMENTS

| 2,364,686 | 12/1944 | Balisteri et al. | 261/121 M X |
| 2,628,447 | 2/1953 | Brown | 261/84 X |
| 2,628,827 | 2/1953 | Daman | 261/87 |
| 2,641,455 | 6/1953 | Poirot | 261/121 M X |
| 2,673,724 | 3/1954 | Potts | 261/87 |
| 2,951,309 | 9/1960 | Briscoe | 261/121 M X |
| 2,970,401 | 2/1961 | Hays | 261/121 M X |
| 3,235,235 | 2/1966 | Umbricht et al. | 261/29 |
| 3,323,249 | 6/1967 | Randall | 261/121 M X |
| 3,333,834 | 8/1967 | Brewster | 261/84 |
| 3,393,802 | 7/1968 | Logue et al. | 261/84 X |
| 3,489,074 | 1/1970 | Farkas et al. | 99/249 |
| 3,778,233 | 12/1973 | Blough et al. | 261/124 X |
| 3,807,708 | 4/1974 | Jones | 261/120 X |
| 3,827,679 | 8/1974 | Kaelin | 261/93 X |
| 3,935,156 | 1/1976 | Richter | 261/120 X |
| 3,962,381 | 6/1976 | Farrish et al. | 260/123 X |

Primary Examiner—Richard L. Chiesa
Attorney, Agent, or Firm—Frederick E. Lange

[57] ABSTRACT

An aerator in which air is forced into the liquid by means of a helical rib surrounding a cylindrical member which is rotated in such a direction that air trapped beneath the helical rib is forced downwardly into the liquid. A diffuser at the bottom of the helical rib is effective to break up the trapped air bubbles into finer bubbles which are dispersed through and retained by the liquid. The cylindrical member on which the helical rib is disposed may be rotated by an electric motor which may be disposed either above the water line or beneath the water line at the bottom of the helical rib. Where necessary, air may be pumped into the space above the water so as to facilitate the introduction of air about the helical rib. Where the aerator is to be used with a container of limited size, the aerator may be either mounted on the cover of the container or may have associated therewith a closure member adapted to fit into the neck of such a container. Where the device is to be used for aerating a large body of water, it may be provided with buoyant material so as to cause the aerator to float on the surface of the water. The buoyant material may be housed in an inverted dome and the motor may be housed in this dome. A shroud may surround the helical rib for a distance into the water to minimize the tendency of air above the water, as distinguished from fresh air, to be drawn in by the helical member as it is rotated.

14 Claims, 7 Drawing Figures

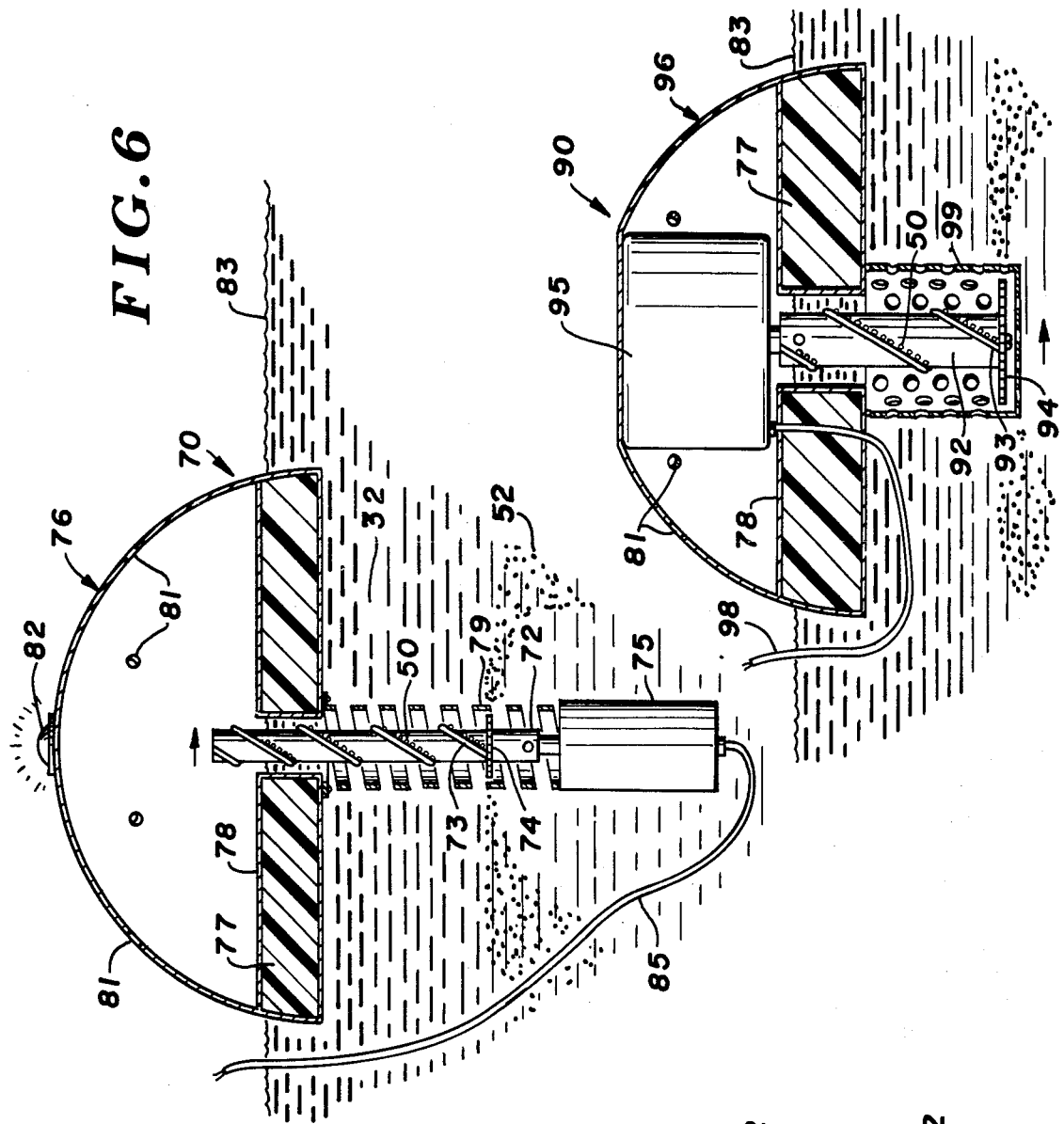
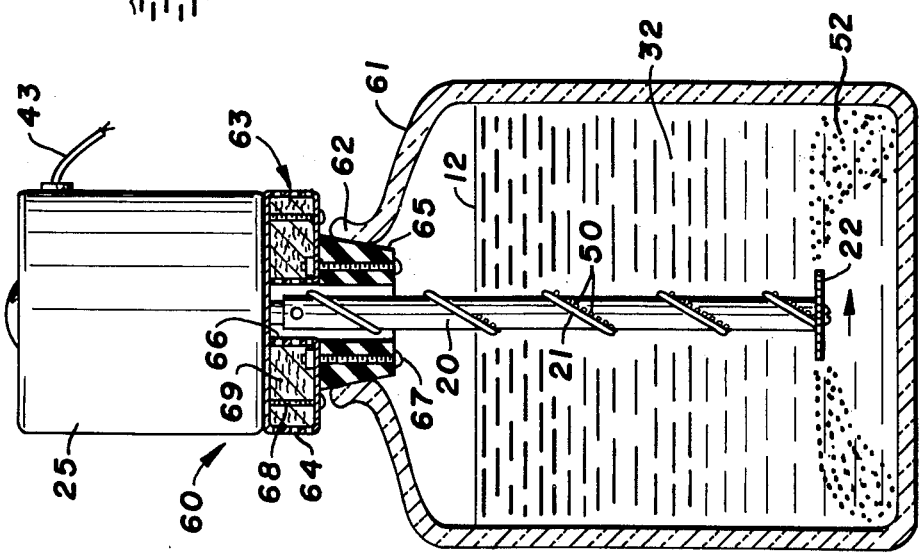

4,117,044

AERATOR

This is a continuation of application Ser. No. 668,501, filed Mar. 19, 1976, now abandoned.

BACKGROUND OF THE INVENTION

There are numerous instances in which it is desirable to introduce air into a liquid. Among such instances are aerobic digestion, activated sludge, lagoons and ponds, oxidation pools, sewage treatment plants, minnow tanks, bacteria culture laboratories, and so forth. Numerous means have been devised for introducing air into a liquid. Often, such means has taken the form of some device which circulates the liquid and in the process introduces air. For example, water may be pumped downwardly through a tube with the air being drawn in as a result of the movement of the liquid. In some cases, the liquid is simply thrown up into the air entraining air as it falls. Many of these prior art devices rely upon movement of the liquid in order to create the necessary movement of the air. Consequently, additional power is required since the movement of a liquid requires greater effort than the movement of air alone.

SUMMARY OF THE PRESENT INVENTION

The present invention is concerned with a device in which the air is introduced into the liquid by a device which has relatively little effect on the water itself but traps air and moves it downwardly where it is engaged by a diffuser and broken up into fine particles.

Specifically, this is accomplished by providing a rib which extends around the peripheral surface of a cylindrical member in a number of turns which progress downwardly as the cylindrical member passes around the periphery of the cylindrical member. This rib member has a lower wall of a configuration tending to retain air bubbles on its under side. This rib member is rotated and the air bubbles tend to be forced downwardly into engagement with the diffuser.

More specifically, the rib member is in the form of a helix with the rib inclined to the horizontal at an angle between 5° and 80°.

In one specific form, the rib member is secured to the outer peripheral surface of the cylindrical member and the rib member and cylindrical member are rotated as a unit. The diffuser may also be secured to the cylindrical member and rotated therewith.

The rib member has a radial depth from the surface of the cylindrical member to the outer wall of the rib member which is normally relatively small compared with the diameter of the cylindrical member to avoid excessive movement of the liquid. While the radial depth of this rib can be as small as 5% of the diameter of the cylindrical member and is normally less than 50% of the diameter, it can be as great as several times the diameter of the cylindrical member when the cylindrical member is of relatively small diameter.

Where the aerator is to be used with a body of liquid disposed within a container, the aerator is provided with means for securing the same to the container with the cylindrical member, the rib member, and the diffuser extending downwardly into the container and with the upper portion of the rib member preferably extending above the top of the container so as to be freely accessible to air. Where the container is of the type having a relatively narrow opening, the aerator may be provided with a closure designed to engage the wall of such opening and retain the aerator in position.

Where the aerator is being used with a large body of liquid, the aerator may be provided with buoyant material effective to cause the aerator to float in the body of liquid. The buoyant material may be housed in an inverted dome which may also house a motor for rotating the rib member.

In some instances, the motor for rotating the rib member may be located at the bottom end of the rib member so as to be immersed in the liquid.

In some instances, it may be desirable to provide means for forcing a flow of air into engagement with the rib member above the level of the liquid. This can take the form of a motor operated air pump.

The diffuser may be any device which effectively breaks up the air bubbles into finer air bubbles. One form that the diffuser may take is that of a perforated disc having perforations intersecting the outer periphery of the disc.

Various other features of the invention will be apparent from a consideration of the accompanying specification, claims and drawing.

BRIEF DESCRIPTION OF THE DRAWING

FIG. 5 is a view of a modification of my invention designed for use with carboys;

FIG. 6 is another embodiment of our invention in which the aerator floats upon the surface of the water, the motor being located beneath the helical rib; and FIG. 7 is a further modification in which the aerator floats upon the surface of the water, the driving motor in this case being located in an inverted dome in which the buoyant material is positioned.

DESCRIPTION OF SPECIFIC EMBODIMENTS OF THE INVENTION

Figure 1:
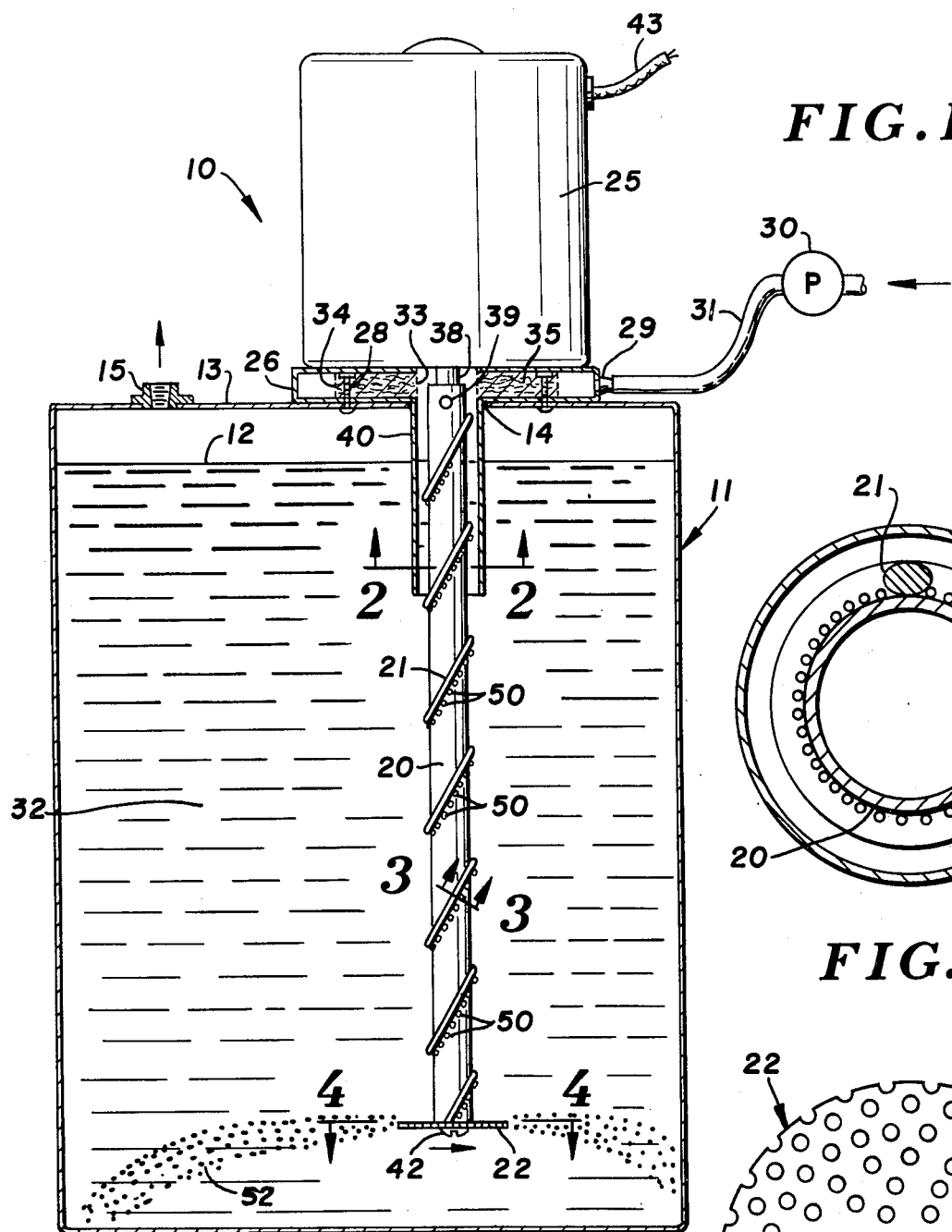
FIG. 1 is a view partly in section showing the improved aerator of our invention.
Figure 2:
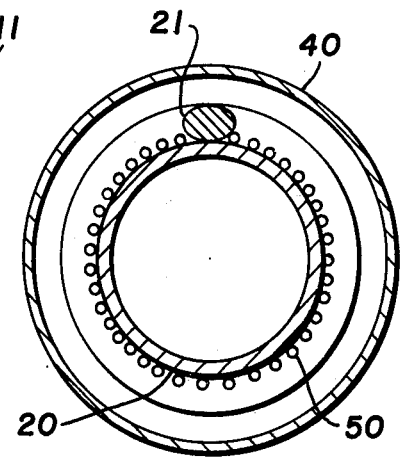
FIG. 2 is a sectional view with the section being taken along and in the direction of the arrows adjacent the line 2—2 of FIG. 1.

Referring to the drawings and particularly to FIG. 1, the reference numeral 10 is employed to generally represent the improved aerator of our invention. This aerator is secured to a container 11 containing liquid 32, the upper level of which is indicated by the reference numeral 12. The container has an upper wall 13 in which there is a relatively large opening 14 therethrough through which a portion of the aerator 10 extends, as will be presently explained. The upper wall 13 also has a smaller opening in which is disposed a fitting 15 which may be in the form of a coupling designed to be coupled to a device for filling the container, removing liquid therefrom, or exhausting stale air.

Figure 4:
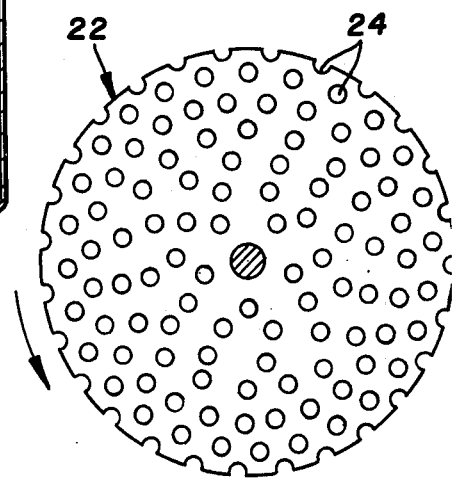
FIG. 4 is a sectional view taken along the line 4—4 of FIG. 1 and constituting a top plan view of the diffuser.
Figure 3:
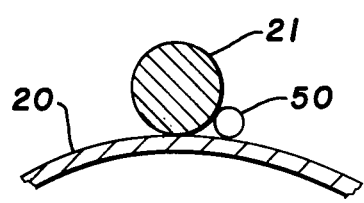
FIG. 3 is a fragmentary sectional view with the section being taken along the line 3—3 of FIG. 1.

Referring now to the aerator, this aerator comprises a cylindrical tube 20 having an outer peripheral surface about which is disposed a rib member 21. In the specific embodiment shown, the rib member is secured to the outer periphery of the tube 20 and extends helically around the tube from near the top thereof to the bottom in uniform helical turns disposed at an angle of approximately 60° with respect to the horizontal. As shown in the fragmentary sectional view of FIG. 3, the rib 21 is of circular cross section in the embodiment of FIG. 1. It is to be understood, however, as will be pointed out in more detail, that the rib may be of other cross sectional configurations. As pointed out earlier, the radial depth of rib 21 from the surface of the cylindrical tube 20 to the outer wall of the rib member is normally relatively small compared with the diameter of the tube 20 so as to avoid excessive movement of the liquid. Preferably, the radial depth of the rib is between 5 and 50 percent of the diameter of the tube. Because of the relatively small radial depth of the rib 21, very little movement of the liquid is produced. Disposed adjacent the bottom of the tube 20 and secured thereto by a screw 42 or other suitable fastening means is a diffuser disc 22 which is best shown in FIG. 4. It will be noted from FIG. 4 that this diffuser disc 22 has a large number of apertures 24 therethrough, some of which apertures intersect the outer peripheral wall of the disc. As will be pointed out later, the function of the diffuser is to break up air bubbles carried down by the rib 21 and the fact that some of the perforations intersect with the outer wall further helps this function.

The tube 20, the helical rib 21 and the diffuser 22 are rotated by any suitable means such as an electric motor 25 shown as located in a housing. This electric motor may be of any suitable type having a suitable speed of rotation and preferably one of a type which can be energized by an ordinary commercial source of electricity. Motor speeds of from 2200 to 3500 r.p.m. have proven to be vary satisfactory although motor speeds which are much lower and much higher have been satisfactorily employed. The motor is supported on an annular bracket 26 which is secured to the housing of motor 25 and is secured by suitable fastening means 28 to the top wall 13 of the container 11. The outer wall of the annular bracket 26 has a nipple 29 secured thereto, this nipple being provided for admission of outside air to the interior of the annular bracket member 26. While the nipple may be merely exposed to the atmosphere, it is desirable in some cases, in order to insure an adequate supply of outside air being supplied to the aerator, to provide a pump 30 which pumps air through a hose 31 to the nipple 29 and hence into the interior of the annular bracket 26 which, it will be noted, is in communication with the upper end of the rib 21. In order to guard against any foreign matter being introduced, it is desirable to provide a plurality of annular screens 33 and 34. Suitable filter material 35 is located between screens 33 and 34.

The motor 25 is provided with a shaft 38 which extends inside the cylindrical tube 20 and is secured thereto by suitable fastening means such as a rivet 39. Thus, whenever the motor 25 is placed in operation, the shaft 38 is rotated to in turn rotate the tube 20 and the helical rib 21. The direction of rotation is that indicated by an arrow adjacent the bottom of the diffuser 22. In other words, the tube 20 is rotated in a clockwise direction as viewed from the bottom of the tube. This direction of rotation is opposite to the direction in which the helical rib extends around the tube 20. The purpose of this will be explained later. Depending downwardly from the bracket member 26 is a cylindrical shield or shroud 40. The purpose of this, as will be explained more later, is to insure that any air entering the space surrounding the upper end of the rib 21 is fresh air introduced through the nipple 29 and not the air existing above the upper lever 12 of the liquid.

The diffuser 22 is secured in any suitable manner to the bottom of tube 20. For example, the screw 42 which extends through the center of the diffuser may be threaddedly engaged with an internal threaded collar of the tube 20. In this way, the diffuser is rigidly secured to tube 20 and rotatable therewith. At the same time, it can be readily removed for cleaning in case the passages 24 become clogged with any material present in the liquid being aerated.

Referring now to the operation of the device, the motor 25, as previously explained, is connected to any suitable commercial source of power by a cable 43. Suitable switching means are of course provided in the connection. When the motor is turned on, the tube 20, the helix 21 and the diffuser disc 22 are all rotated in a direction, as explained above, which is clockwise as viewed from the bottom of the tube 20. At the same time, the pump 30, if the air is being pumped into the unit, is turned on. The result is that air is supplied to the interior of the bracket member 26 through the screens 34 and 33 and filter 35 into the space at the upper end of tube 20. The air goes downwardly and engages the under surface of the rib 21. The result is that air bubbles form beneath the lower wall of the submerged portion of rib 21. This is aided by the fact that due to the circular cross section of the rib, it has a curved peripheral wall and a pocket is formed between this curved peripheral wall and the region of the tube 20 along which the rib is joined to the tube. Such a pocket exists both adjacent the upper and lower surfaces of the wall. Any bubbles, however, on the upper surface tend to float off. The bubbles underneath the rib, however, are trapped and remain in the recess between the lower portion of the rib and the tube. These bubbles are indicated by the reference numerals 50. It will be noted that they are disposed along the lower edge of the rib all the way from the water line down to the diffuser 22.

The reason why the air bubbles are dispersed along the entire length of the rib 21 is that as the tube, and hence the rib, is rotated, the air bubbles are forced to travel down along the rib since the direction of rotation is such that the rib is pushing against the bubbles which thus tend to move downwardly along the inclined wall formed by the helix. These bubbles 50 continue to move downwardly until they eventually engage the diffuser 22. At this point, they are exposed to the diffuser which has a plurality of apertures 24 therethrough, as previously explained. The diffuser, furthermore, is rotating along with the helix. The air bubbles can obviously travel no further along the helix and become dispersed and pass through and engage the walls of the rotating apertures 24 of the diffuser 22. The effect of the diffuser, by reason of the large number of apertures 24 each with a cylindrical wall and with the notched peripheral edge formed by reason of the fact that the apertures intersect the outer peripheral edge of the diffuser disc 22, is to break the air bubbles up into very fine bubbles which are sufficiently small to remain in suspension in the liquid. This action is indicated by the cloud of dots 52.

Inasmuch as air is constantly being introduced through the nipple 29, pressure would build up in the container 11 if it were not for the opening 15 which acts as a vent to permit air to escape. By reason of this vent, the space above the liquid line 12 is maintained at substantially atmospheric pressure.

In many cases, the air above the liquid level 12 may become contaminated with other gases. This is particularly true if the container 11 contains liquid which is being subjected to some treatment process. For example, one particular application of the aerator of the present invention is in connection with fermentation tanks. It would obviously be undesirable in such cases to allow the air above the liquid level 12 to be drawn in and reintroduced into the liquid. It is for this reason that the shroud 40 is provided. This shroud extends from the bottom of the bracket member 25 down into the liquid sufficiently so that its lower end is always below the level of the liquid. At the same time, the shroud 40 only extends a portion of the length of the helix 21. In other words, it does not form any part of a pumping action. The movement of the air bubbles downwardly is completely independent of shroud 40, the air bubbles moving downwardly solely because of being trapped beneath the rib 21 and being forced along the inclined edge of the rib as the rib is rotated.

It will be noted that the aerator is mounted with its vertical axis displaced from the central vertical axis of the container. It has been found that with certain containers having cylindrical walls, there is a tendency for the mixture to swirl about the container when the aerator is mounted centrally of the container. This tendency is avoided by mounting the aerator "off center".

While the rib 21 is shown as being of circular cross section, it is to be understood that other cross sections could be employed. For example, the rib 21 could be of triangular cross section with the apex of the triangle adjacent the tube 20. In this case, it would still be possible for air bubbles to be retained beneath the lower edge of the rib, particularly at the junction of the rib with the cylindrical tube.

MODIFICATION OF FIG. 5

In FIG. 5, we have shown a modification of our invention in which the primary difference is that the aerator 60 of FIG. 5 is designed for use with the type of container commonly referred to as a carboy. In FIG. 5, the same reference characters have been used for similar elements and many of these elements will not be described again in detail. Thus, the aerator comprises an electric motor 25, the output shaft of which is connected to a cylindrical tube 20 about which is disposed a rib 21 preferably disposed helically in the same manner as in FIG. 1. Secured to the bottom of the tube 20 is a diffuser 22 of the same configuration as that of FIG. 4.

As pointed out previously, the aerator 60 of FIG. 5 is designed to be used with the type of container commonly referred to as a carboy and designated by the reference numeral 61. The carboy 61 has a neck portion 62 which encloses an opening providing access to the interior of the carboy 61.

The motor 25 has secured thereto an annular bracket member 63 corresponding in function to the bracket member 26 and secured to the motor housing by bolts 68. The primary difference is that in the case of bracket member 63 instead of there being an outer imperforate annular wall except for the nipple 29, there are a series of openings 64 space about the outer annular wall so that the outer annular wall acts as a screen. There is also an inner annular screen 66 and filter material 69 disposed between screen 66 and the perforated outer annular wall. The openings 64 in the outer annular wall are designed so as to admit an adequate amount of air for the operation of the aerator. Thus, there is no air pump as with FIG. 1. It is, of course, understood that where the requirements of the operation with which the aerator is associated are such that an inadequate amount of air is obtained this way, an arrangement similar to that of FIG. 1 can be employed. In other words, air may be pumped to the space above the rib 21. It will also be noted that secured to the under side of the bracket 63 is a conically shaped member 65 which may be of rubber or other resilient material unaffected by the liquid in the carboy and capable of acting as a closure for the carboy. This closure member may be secured to the bracket 63 by suitable fastening means such as bolts 67 which extend through the closure member 65 and into the lower wall of the bracket member 63, being secured to this lower wall by nuts or other fastening means.

The operation of the unit is basically the same as that of FIG. 1. In the present instance, a shroud corresponding to shroud 40 has been omitted simply because the process is such that there is no objection to some of the air above the liquid from being reintroduced into the liquid. If, however, the process is one where such reintroduction of the air above the liquid is undesirable, a shroud similar to shroud 40 can be incorporated into the structure.

As with the arrangement of FIG. 1, when the motor 25 is energized, the cylindrical tube 20 and the rib 21 thereon are rotated in a clockwise direction as viewed from the bottom of the tube to cause air bubbles trapped beneath the helical rib 21 to travel progressively down the rib 21 until they engage the diffuser 22 at which point they are broken up into a cloud of bubbles indicated by the numeral 52, as in FIG. 1.

MODIFICATION OF FIG. 6

The aerator 70 of FIG. 6 is similar in principle to but quite different in structure from that shown in FIGS. 1 through 5. The aerator 70 is designed to be used with relatively large bodies of water such as oxidation pools, lakes and streams, lagoons and ponds, and so forth. In such large bodies of water, it is difficult to secure the aerator in a desired position. Consequently, the aerator 70 is designed to float upon a body of water, the surface of which is indicated by the numeral 83. In the arrangement of FIG. 6, the motor 75 is submerged beneath the surface of the water and is at the lower end of the cylindrical tube and helical rib which have been referred to in this figure by the reference numerals 72 and 73, respectively. Similarly, the diffuser disc 74, which may be of generally the same construction as that of FIG. 4, is located between the motor and the helical rib 73. It is still, however, located at the bottom of the helical rib 73 and, as will be presently explained, its operation is the same as that of FIG. 1.

The motor, the tubular member 72, the rib 73 and the diffuser 74 are all supported from floating housing 76. This housing is in the form of an inverted dome and is maintained is suspension by an annular body 77 of suitable buoyant material such as a polyurethane foam. In order to maintain its buoyant properties, the body 77 is encased in a liquid tight sheath 78 of a non-corrosive material such as stainless steel. This may either completely enclose the polyurethane foam body 77 or be sealed to the inner wall of the dome 76. The sheath 78 has secured to the lower wall thereof a cylindrical cage 79, the lower end of which is secured to the motor 75 to support the motor, the tube 72, the rib 73 and the diffuser 74. The cage 79 is of such design as to permit the free passage of fluid therethrough. For example, the cage may be formed of a helical strip of material which is wound into the form of a cylinder. Or, the cage 79 may be a cylinder with a plurality of perforations therethrough.

Dome 76 is provided with a plurality of openings 81, which openings are well above the water line 83. These openings, of course, are provided for the admission of air into the upper portion of the dome and thus into engagement with the rib 73. The dome may also be provided with a light 82 which will serve as a warning light to warn about the presence of the aerator. For example, if the aerator is placed into a pond, light 82 would alert anyone on the pond to the fact that the aerator is there. The light 82 can be an electric light energized from any suitable source of power. For example, the light 82 can be connected to the same source of power as motor 75.

The motor 75 like motor 25 of FIGS. 1 and 4 is an electrical motor suitable for operation from a commercially available source of power. An electrical cord 85 extends from the motor 75 through the water to a suitable point of connection with such a source of power, such as an electrical outlet. It is, of course, understood that the motor 75 is housed within a liquid tight case, preferably of non-corrosive material such as stainless steel. Similarly, the cord 85 is sealed against the admission of liquid into the interior thereof. When the electrical cord 85 is so connected to a source of power and any switch in the connection is turned on, the motor 75 becomes energized to rotate the tube 72 and hence the rib 73 and the diffuser 74. Again, the direction is in the direction of the arrow shown and is in a clockwise direction as viewed from the bottom of tube 72. The air which enters through the openings 81 is propelled by the helical rib 73 downwardly. As soon as it enters the water, the air is in the form of air bubbles which are trapped beneath the lower edge of the helical rib 73 adjacent the wall of tube 72. As the motor rotates, these air bubbles move downwardly along the edge of the rib 73 until they engage the diffuser disc 74 at which time they are broken up in the same manner as described previously to produce a cloud of fine bubbles 52. Any suitable anchorage means may be provided for preventing rotation of the entire unit of FIG. 6 or 7.

MODIFICATION OF FIG. 7

The modification of FIG. 7, like that of FIG. 6, is designed to be used with a large body of water in which is is more practical to float the unit on the surface of the water than it is to try to secure it to some fixed support. Again, the surface of the body of water is indicated by the reference numeral 83. In this particular embodiment, the inverted dome 96 is so shaped as to accommodate the motor 95 so that the motor 95 is located above the water line. The output motor shaft is connected to a cylindrical shaft such as a tube 92 around which is disposed a helical rib 93. Similarly, a diffuser disc 94 is connected to the lower end of the tube 92. The diffuser disc 94 may be of the same configuration generally as that of FIG. 4. Similarly, the rib 93 may be of the same circular cross section as rib 21. The dome 96 is retained in floating relation with the water 83 by an encased annular body of flotation material 77 which is encased in a waterproof housing 78 just as in FIG. 6. Secured to the under side of this housing 78 is a perforated cage 99 which encloses the tube 92, the rib 93 and the diffuser disc 94. The sole function of the cage 99 in this case is to guard against the tube 92, the rib 93 or the diffuser disc 94 being accidentally struck by some object in the water. The cage 99 is provided with sufficient apertures therethrough to permit free access of water to the interior thereof.

As with motor 75 of the embodiment of FIG. 6, the motor 95 is designed to be connected to a suitable source of power by an electrical conductor 98 which extends downwardly through the water and hence to a desired point of electrical connection.

In operation, the unit of FIG. 7 is basically the same as that of the other figures. Air is admitted through the openings 81 to the interior of dome 96 and hence to the under side of rib 93. The air travels down in a series of bubbles as the tube 92 is rotated in a clockwise direction as viewed from beneath the tube. Again, when these air bubbles engage the diffuser 94 they are broken up into a fine cloud of minute bubbles which are retained in the liquid.

The material of which the aerator of FIG. 7 is made and that of the other figures is largely dependent upon the nature of the application. Where the liquid is at all apt to be corrosive, a non-corrosive material such as stainless steel should be employed for the tubular member, the helical rib, the diffuser and any other parts which come in contact with the liquid.

In connection with FIG. 1, it was indicated that the pitch selected was approximately 60°. This pitch can be anywhere from 5° to 80° although a 60° pitch is a desirable pitch. Obviously, if the pitch is made too small with respect to a horizontal plane through the rib, the rib will be excessively long. If on the other hand, the pitch is too great, the air bubbles will tend not to be retained on the under side of the rib and will tend to rise to the surface.

CONCLUSION

It will be seen that we have provided an aerator in which very little movement of the water is produced, thus reducing to a minimum the amount of power required to operate the aerator. It will further be seen that we have provided an extremely simple construction which is readily adaptable for different types of containers and also for use in large bodies of water.

While we have shown certain specific embodiments of our invention, it is to be understood that this is for purposes of illustration only and that the scope of our invention is to be limited solely by that of the appended claims.

We claim:

1. An aerator comprising,
    a cylindrical member,
    a rib member extending around a peripheral surface of said cylindrical member in a number of turns and extending progressively downwardly as it successively passes around the periphery of said cylindrical member, said rib member having a lower wall of a configuration retaining gas bubbles on the under side thereof and said rib member having a radial depth of less than 50 percent of the diameter of said cylindrical member,
    means for supporting said aerator with respect to a body of liquid having gas thereabove in such a position vertically that a portion of said rib member extends above the level of the liquid into the gas above the liquid and a substantial portion extends downwardly into direct contact with the liquid with the longitudinal axis of said rib member extending substantially vertically,
    a relatively thin diffuser secured adjacent the lower end of said rib and rotatable therewith, said diffuser having an axis extending substantially perpendicular to said rib member axis, and being formed with substantially flat opposed major surfaces so as to eliminate virtually all liquid propelling action when rotated, and means for rotating said diffuser and said rib member about its longitudinal axis in such a direction that gas bubbles trapped beneath the lower wall of said rib by reason of the portion of the rib extending above the liquid into the gas above move downwardly until they engage the diffuser and are broken up into fine bubbles of a size remaining dispersed in the liquid, said rib member being free of any imperforate enclosure closely surrounding the same for the major portion of its longitudinal extent so that the absence of such an enclosure and the relatively small radial depth of said ribs renders the rotation of said rib member virtually ineffective to cause movement of the liquid.

2. The aerator of claim 1 in which the rib member is in the form of a helix with the rib inclined to the horizontal at an angle of between 5° and 80°.

3. The aerator of claim 1 in which the rib member is secured to the outer peripheral surface of said cylindrical member and in which the rib member and cylindrical member are rotated as a unit.

4. The aerator of claim 3 in which said diffuser is also secured to said cylindrical member and is rotated therewith.

5. The aerator of claim 1 in which said body of liquid is disposed within a container and in which said aerator is provided with means for securing the same to said container with said cylindrical member, said rib member, and said diffuser extending downwardly into said container.

6. The aerator of claim 5 in which said aerator is provided with a closure member designed to engage the wall of the opening in such a container.

7. The aerator of claim 5 in which means is provided for causing a flow of gas into engagement with the portion of said rib above the level of the liquid.

8. The aerator of claim 5 in which the aerating gas is atomspheric air, there is a chamber for conveying atmospheric air to the upper portion of said rib member, and means surrounding said rib member and cylindrical member from said chamber to a region below the lowest probable liquid level to prevent air in said container above said liquid from engaging said rib member.

9. The aerator of claim 1 in which said aerator is provided with buoyant material effective to cause said aerator to float in the body of liquid.

10. The aerator of claim 9 in which there is an inverted dome in which said buoyant material is located and in which the means for rotating the rib member is a motor located in said dome.

11. The aerator of claim 1 in which the means for rotating the rib member is an electrical motor.

12. The aerator of claim 11 in which the electrical motor is disposed above said cylindrical member so as to be in the gas above said body of liquid.

13. The aerator of claim 11 in which the electrical motor is disposed beneath said rib member so as to be submerged in said body of liquid.

14. The aerator of claim 1 in which said diffuser is a perforated disc having perforations intersecting the outer periphery of the disc.

* * * * *